(12) United States Patent
Ferlitsch (10) Patent No.: US 8,384,929 B2
(45) Date of Patent: Feb. 26, 2013

(54) SYSTEMS AND METHODS FOR EFFICIENTLY HANDLING IMAGE DATA

(75) Inventor: Andrew R. Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1163 days.

(21) Appl. No.: 11/744,056

(22) Filed: May 3, 2007

(65) Prior Publication Data

US 2008/0273214 A1 Nov. 6, 2008

(51) Int. Cl.
*G05F 3/12* (2006.01)
*G06K 15/00* (2006.01)

(52) U.S. Cl. ............... 358/1.15; 358/1.13; 358/1.16; 358/1.18

(58) Field of Classification Search .............. None
See application file for complete search history.

(56) References Cited

U.S. PATENT DOCUMENTS

| | | | |
|---|---|---|---|
| 6,034,786 A | 3/2000 | Kwon | |
| 6,453,129 B1 | 9/2002 | Simpson et al. | |
| 6,559,958 B2 | 5/2003 | Motamed et al. | |
| 6,825,948 B1 * | 11/2004 | Hayashi et al. | 358/1.18 |
| 6,991,319 B2 * | 1/2006 | Zerza et al. | 347/43 |
| 2002/0021359 A1 | 2/2002 | Okamoto | |
| 2002/0060801 A1 | 5/2002 | Motamed et al. | |
| 2003/0107777 A1 | 6/2003 | Yamade et al. | |
| 2003/0120729 A1 | 6/2003 | Kim et al. | |
| 2004/0012813 A1 | 1/2004 | Wu et al. | |
| 2004/0044670 A1 * | 3/2004 | Cazier | 707/100 |
| 2004/0184072 A1 * | 9/2004 | Jacobsen et al. | 358/1.15 |
| 2004/0218209 A1 * | 11/2004 | Hamaguchi et al. | 358/1.15 |
| 2004/0234169 A1 * | 11/2004 | Tojo | 382/305 |
| 2005/0013642 A1 * | 1/2005 | Kawamoto | 400/62 |
| 2005/0094161 A1 * | 5/2005 | Do et al. | 358/1.1 |
| 2005/0160260 A1 * | 7/2005 | Yasuda | 713/157 |
| 2005/0225779 A1 | 10/2005 | Kubota | |
| 2006/0120786 A1 * | 6/2006 | Hisatomi et al. | 400/62 |

FOREIGN PATENT DOCUMENTS

| | | |
|---|---|---|
| EP | 0729090 | 8/1996 |
| EP | 0949804 | 10/1999 |
| JP | 2003229981 | 8/2003 |
| JP | 2004-318854 | 11/2004 |
| WO | 0165352 | 9/2001 |

OTHER PUBLICATIONS

Sharp AR-M620N, http://www.sharpusa.com/products/ModelLanding/0,1058,1262,00.html, Aug. 20, 2007.

* cited by examiner

*Primary Examiner* — Marivelisse Santiago Cordero
*Assistant Examiner* — Huo Long Chen
(74) *Attorney, Agent, or Firm* — Austin Rapp & Hardman (57) ABSTRACT

A method for efficiently handling image data may involve creating an imaging job that includes image data corresponding to an outputting operation that is to be performed by an imaging device. The method may also involve determining whether the image data includes one or more reduced size images in addition to one or more full size images. The method may also involve determining whether the one or more reduced size images are satisfactory for the outputting operation. If the image data includes the one or more reduced size images in addition to the one or more full size images, and if the one or more reduced size images are satisfactory for the outputting operation, the method may involve despooling the one or more reduced size images to the imaging device without despooling the one or more full size images to the imaging device.

15 Claims, 8 Drawing Sheets

SYSTEMS AND METHODS FOR EFFICIENTLY HANDLING IMAGE DATA

TECHNICAL FIELD

The present disclosure relates generally to computers and computer-related technology. More specifically, the present disclosure relates to imaging devices and document imaging.

BACKGROUND

"Imaging," as the term is used herein, refers to one or more of the processes involved in the display and/or printing of graphics and/or text. The term "imaging device," as used herein, refers to any electronic device that provides functionality related to imaging. Some examples of imaging devices include multi-function peripheral devices, printers, copiers, scanners, facsimile devices, document servers, image servers, electronic whiteboards, digital cameras, digital projection systems, medical imaging devices, and so forth.

For various reasons, an imaging device may be logically connected to (i.e., placed in electronic communication with) one or more computer systems, which may be referred to as host computer systems (or simply as hosts). For example, a printer may be connected to a network of computer systems. This allows the users of the various computer systems on the network to use the printer.

Different kinds of computer software facilitate the use of imaging devices. The computer system that is used to image (e.g., print) the materials typically has one or more pieces of software that enable it to send information to the imaging device to facilitate the imaging of the materials. If the computer system is on a computer network there may be one or more pieces of software running on one or more computers on the computer network that facilitate the imaging of the materials.

As used herein, the term "imaging job" may refer to information about an imaging-related task that is performed by an imaging device. An imaging job may include image data corresponding to an outputting operation that is to be performed by the imaging device. An imaging job may also include one or more settings that indicate how certain aspects of the desired outputting operation are to be carried out. An example of an imaging job is a print job, which may be a single document or a set of documents that is submitted to a printer for printing.

Under some circumstances, a host computer system may directly despool image data to an imaging device (i.e., without the image data being converted to a different format before being despooled). If the imaging device is a printing device (e.g., a multi-function peripheral device or a dedicated printer), this may be referred to as direct image printing. Some examples of image formats that may be supported for direct image printing include TIFF, JPEG, PNG, GIF, BMP, HD, EXIF, etc.

DETAILED DESCRIPTION

An imaging device that is configured to efficiently handle image date is disclosed. The imaging device includes a processor, and memory in electronic communication with the processor. Instructions are stored in the memory. The instructions may be executable to receive an imaging job that comprises image data. The imaging job may correspond to an outputting operation that is to be performed by the imaging device. The instructions may also be executable to determine whether the image data comprises one or more reduced size images in addition to one or more full size images. The one or more reduced size images may be reduced size versions of the one or more full size images. The instructions may also be executable to determine whether the one or more reduced size images are satisfactory for the outputting operation. If the image data comprises the one or more reduced size images and if the one or more reduced size images are satisfactory for the outputting operation, the instructions may also be executable to use the one or more reduced size images instead of the one or more full size images for performing the outputting operation.

If the one or more reduced size images are not satisfactory for the outputting operation, the instructions may be executable to use the one or more full size images instead of the one or more reduced size images for performing the outputting operation. Determining whether the one or more reduced size images are satisfactory for the outputting operation may comprise examining one or more settings associated with the imaging job.

The imaging device may determine that the one or more reduced size images are satisfactory for the outputting operation if the outputting operation comprises N-up printing, and N exceeds a threshold value. The imaging device may determine that the one or more reduced size images are satisfactory for the outputting operation if a draft output setting is associated with the imaging job. The imaging device may determine that the one or more reduced size images are satisfactory for the outputting operation if the image data will be used for document indicia.

The imaging device may be a multi-functional peripheral device. The outputting operation may be selected from the group consisting of printing, scanning, copying, filing, faxing, format conversion, digital media duplication, and publishing to the World Wide Web.

A computer-readable medium is also disclosed. The computer-readable medium may comprise instructions that are executable by a host computer system to create an imaging job that may include image data corresponding to an outputting operation that is to be performed by an imaging device. The instructions may also be executable to determine whether the image data comprises one or more reduced size images in addition to one or more full size images. The one or more reduced size images may be reduced size versions of the one or more full size images. In addition, the instructions may also be executable to determine whether the one or more reduced size images are satisfactory for the outputting operation. If the image data comprises the one or more reduced size images in addition to the one or more full size images, and if the one or more reduced size images are satisfactory for the outputting operation, the instructions may also be executable to despool the one or more reduced size images to the imaging device without despooling the one or more full size images to the imaging device.

If the image data comprises the one or more reduced size images in addition to the one or more full size images, and if the one or more reduced size images are satisfactory for the outputting operation, the instructions may also be executable to send the one or more reduced size images through a restreaming process. The restreaming process may reorder the one or more reduced size images into streaming order.

If the image data comprises the one or more reduced size images in addition to the one or more full size images, and if the one or more reduced size images are not satisfactory for the outputting operation, the instructions may be executable to despool the one or more full size images to the imaging device without despooling the one or more reduced size images to the imaging device.

If the image data comprises the one or more reduced size images in addition to the one or more full size images, and if the one or more reduced size images are not satisfactory for the outputting operation, the instructions may also be executable to send the one or more full size images through a restreaming process. The restreaming process may reorder the one or more full size images into streaming order.

If the image data does not comprise the one or more reduced size images in addition to the one or more full size images, and if the one or more reduced size images are satisfactory for the outputting operation, the instructions may be executable to generate the one or more reduced size images from the one or more full size images. The instructions may also be executable to despool the one or more reduced size images to the imaging device without despooling the one or more full size images to the imaging device.

Determining whether the one or more reduced size images are satisfactory for the outputting operation may comprise examining one or more settings associated with the imaging job. The host computer system may determine that the one or more reduced size images are satisfactory for the outputting operation if the outputting operation comprises N-up printing, and N exceeds a threshold value. The host computer system may determine that the one or more reduced size images are satisfactory for the outputting operation if a draft output setting is associated with the imaging job. The host computer system may determine that the one or more reduced size images are satisfactory for the outputting operation if the image data will be used for document indicia. The outputting operation may be selected from the group consisting of printing, scanning, copying, filing, faxing, format conversion, digital media duplication, and publishing to the World Wide Web.

A method for efficiently handling image data is also disclosed. The method may be implemented by a host computer system. The method may include creating an imaging job that comprises image data corresponding to an outputting operation that is to be performed by an imaging device. The method may also include determining whether the image data comprises one or more reduced size images in addition to one or more full size images. The one or more reduced size images may be reduced size versions of the one or more full size images. The method may also include determining whether the one or more reduced size images are satisfactory for the outputting operation. If the image data comprises the one or more reduced size images in addition to the one or more full size images, and if the one or more reduced size images are satisfactory for the outputting operation, the method may also include despooling the one or more reduced size images to the imaging device. This may be done without despooling the one or more full size images to the imaging device.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

The term "determining" (and grammatical variants thereof) is used in an extremely broad sense. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Figure 1:
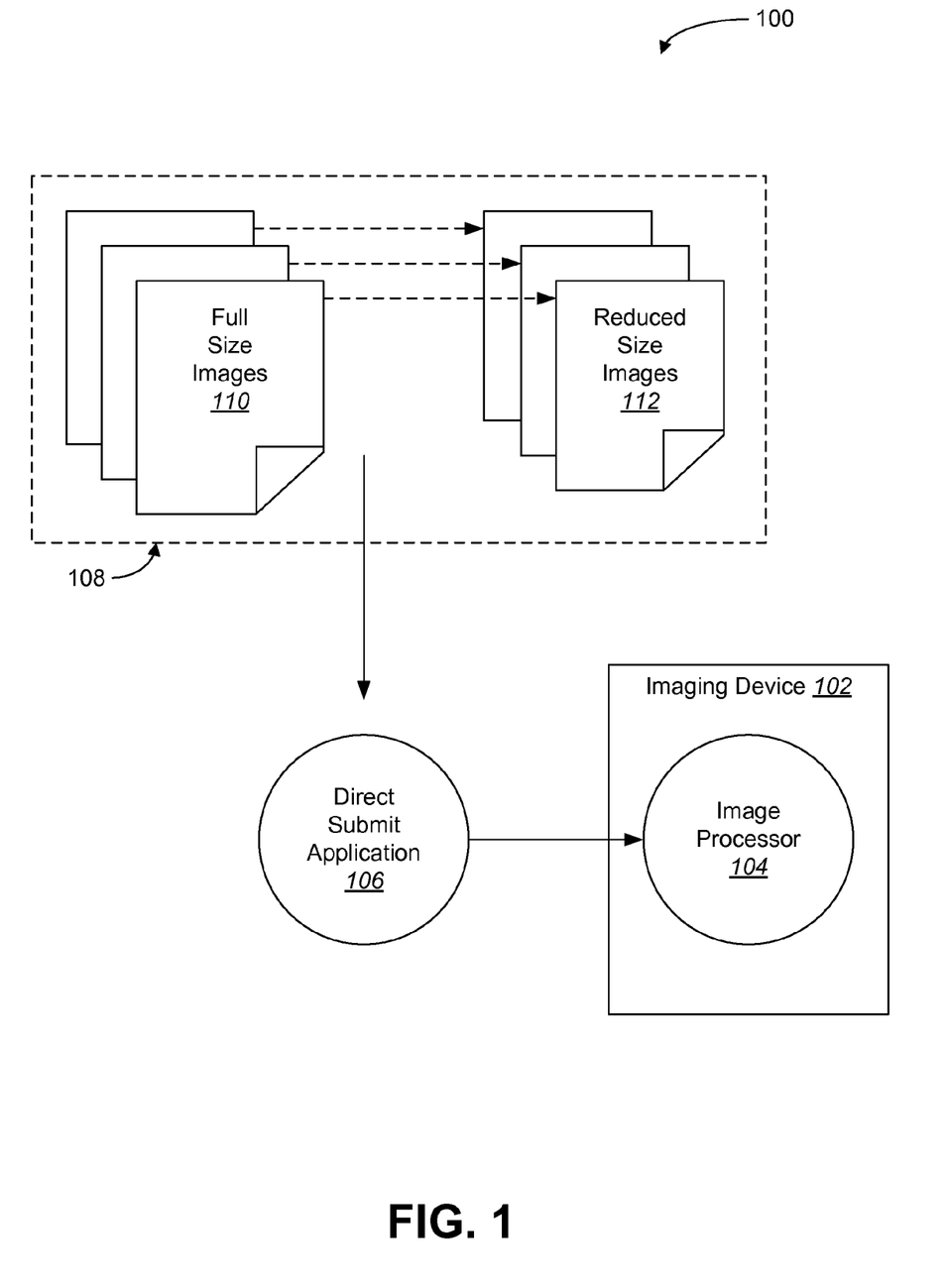
FIG. 1 illustrates an exemplary operating environment in which embodiments may be practiced.

FIG. 1 illustrates an exemplary operating environment 100 in which embodiments may be practiced. An imaging device 102 is shown with an image processor 104. As indicated above, the imaging device 102 may be any electronic device that provides functionality related to imaging. For example, the imaging device 102 may be a multi-function peripheral device, a printer, a copier, a scanner, a facsimile device, a document server, an image server, a format converter, an electronic whiteboard, a digital camera, a digital projection system, a digital media duplication device, a medical imaging device, etc.

The imaging device 102 may support one or more outputting operations. Some examples of outputting operations that may be supported by the imaging device 102 include printing, scanning, copying, filing, faxing, format conversion, publishing to the World Wide Web, duplication, etc.

A direct submit application 106 is also shown. The direct submit application 106 may be configured to directly despool image data 108 to the imaging device 102 (i.e., without the image data 108 being converted to a different format before being despooled). If the imaging device 102 is a printing device (e.g., a multi-function peripheral device or a dedicated printer), this may be referred to as direct image printing. Some examples of image formats that may be supported for direct image printing include TIFF, JPEG, PNG, GIF, BMP, HD, EXIF, etc.

The direct submit application 106 may include other functionality as well. For example, the direct submit application 106 may facilitate user selection of imaging settings. When imaging settings have been selected, the direct submit application 106 may despool the imaging settings along with the image data 108 to the imaging device 102.

The direct submit application 106 may be located on a host computer system (not shown). The host computer system may be directly connected to the imaging device 102. Alternatively, the host computer system may be connected to the imaging device 102 via a local area network. Alternatively still, the host computer system may be remotely connected to the imaging device 102.

The image data 108 shown in FIG. 1 includes both full size images 110 and reduced size images 112 corresponding to the full size images 110. The reduced size images 112 may be reduced size (lower resolution) versions of the full size images 110. For example, the reduced size images 112 may be thumbnail images corresponding to the full size images 110.

Figure 2:
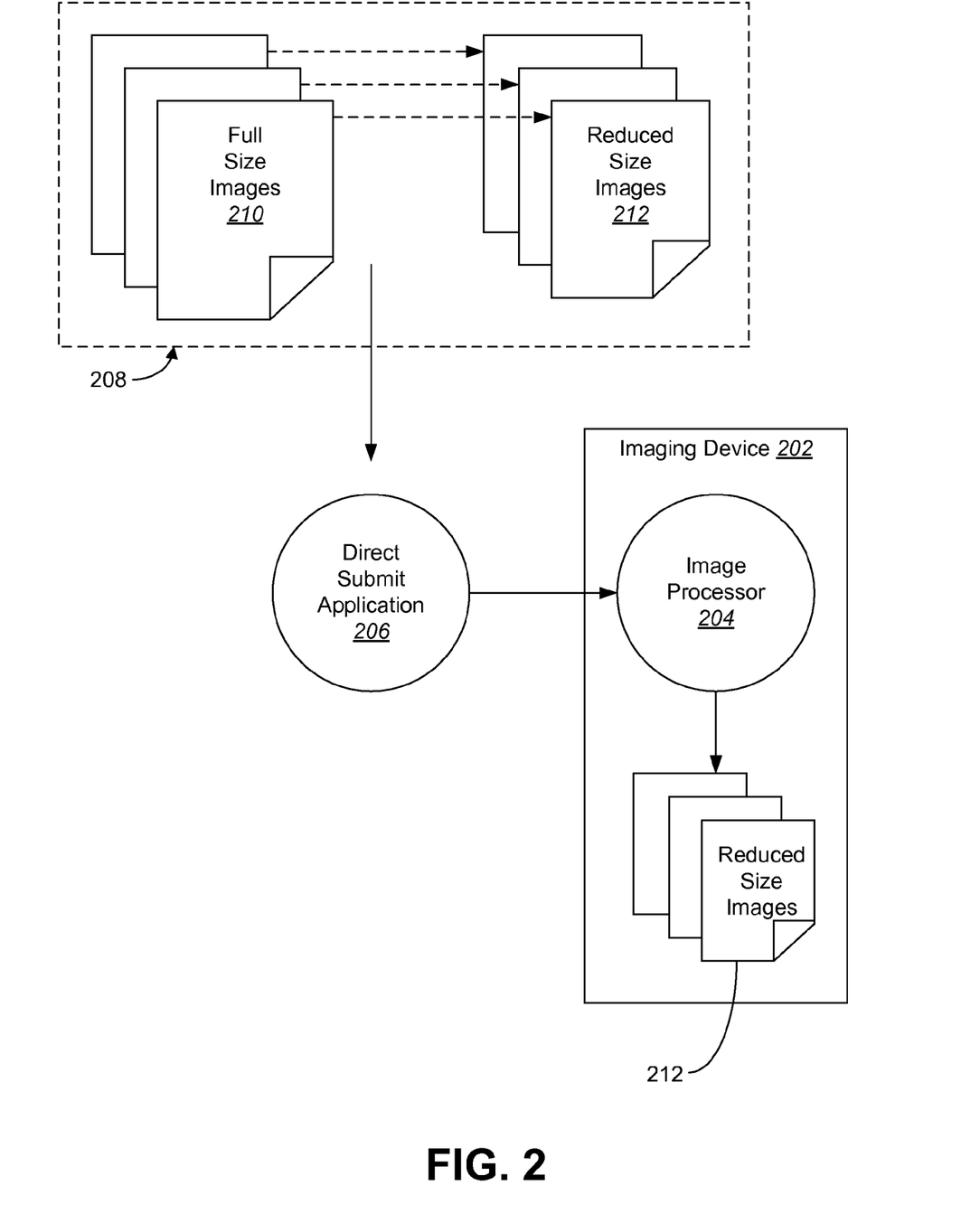
FIG. 2 is a functional block diagram illustrating some aspects of the operation of an imaging device in accordance with an embodiment.

FIG. 2 is a functional block diagram illustrating some aspects of the operation of an imaging device 202 in accordance with an embodiment. The context of FIG. 2 is that the imaging device 202 has received an imaging job for processing. The imaging job may be received from a direct submit application 206, which may be located on a host computer system that is connected (either directly or via one or more computer networks) to the imaging device 202.

The imaging job may include image data 208 corresponding to an outputting operation that is to be performed by the imaging device 202. The imaging job may also include one or more settings that indicate how certain aspects of the desired outputting operation are to be carried out. The direct submit application 206 may directly despool the image data 208 to the imaging device 202.

In response to receiving the imaging job, the imaging device 202 may determine whether the image data 208 includes reduced size images 212 in addition to full size images 210. As indicated above, the reduced size images 212 may be reduced size (lower resolution) versions of the full size images 210. For example, the reduced size images 212 may be thumbnail images of the full size images 210.

The imaging device 202 may also determine whether reduced size images 212 are satisfactory for the outputting operation. The imaging device 202 may make this determination by examining one or more settings associated with the imaging job. For example, the imaging device 202 may determine that reduced size images 212 are satisfactory for the outputting operation if the outputting operation comprises N-up printing (i.e., N logical pages displayed on one physical page), and N exceeds a threshold value. As another example, the imaging device 202 may determine that reduced size images 212 are satisfactory for the outputting operation if a draft output setting is associated with the imaging job. As another example, the imaging device 202 may determine that reduced size images 212 are satisfactory for the outputting operation if the image data 208 will be used for document indicia (e.g., if the image data 208 will be used as a watermark).

If the imaging device 202 determines that the image data 208 includes reduced size images 212 in addition to full size images 210, and if the imaging device 202 determines that reduced size images 212 are satisfactory for the outputting operation, the imaging device 202 may use the reduced size images 212 for performing the outputting operation. The reduced size images 212 may be used instead of the full size images 210 (i.e., the imaging device 202 may not use the full size images 210 for performing the outputting operation).

If, however, the imaging device 202 determines that reduced size images 212 are not satisfactory for the outputting operation, the imaging device 202 may use the full size images 210 for performing the outputting operation. The full size images 210 may be used instead of the reduced size images 212 (i.e., the imaging device 202 may not use the reduced size images 212 for performing the outputting operation).

Figure 3:
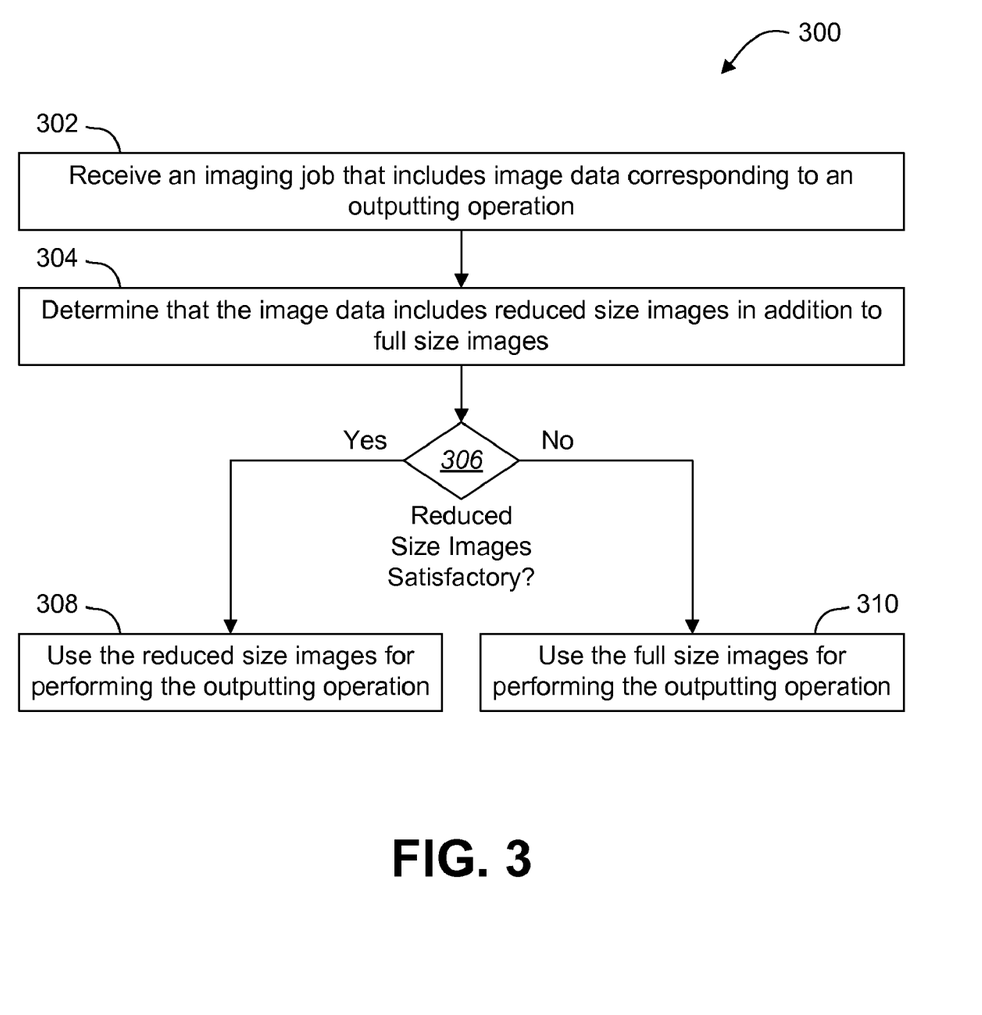
FIG. 3 is a flow diagram illustrating a method that may be implemented by the imaging device of FIG. 2 accordance with an embodiment.

FIG. 3 is a flow diagram illustrating a method 300 that may be implemented by the imaging device 202 of FIG. 2 accordance with an embodiment. In accordance with the depicted method 300, an imaging device 202 may receive 302 an imaging job that includes image data 208 corresponding to an outputting operation that is to be performed by the imaging device 202. The image data 208 may be received 302 from a direct submit application 206, which may be located on a host computer system that is connected (either directly or via one or more computer networks) to the imaging device 202. The direct submit application 206 may directly despool the image data 208 to the imaging device 202.

When the imaging device 202 receives 302 the imaging job, the imaging device 202 may determine 304 that the image data 208 includes reduced size images 212 in addition to full size images 210. As indicated above, the reduced size images 212 may be reduced size (e.g., lower resolution) versions of the full size images 210. For example, the reduced size images 212 may be thumbnail images of the full size images 210.

In response to determining 304 that the image data 208 includes reduced size images 212, the imaging device 202 may determine 306 whether reduced size images 212 are satisfactory for the outputting operation. As discussed above, the imaging device 202 may make this determination by examining one or more settings associated with the imaging job.

If the imaging device 202 determines 306 that reduced size images 212 are satisfactory for the outputting operation, the imaging device 202 may use 308 the reduced size images 212 instead of the full size images 210 for performing the outputting operation. If, however, the imaging device 202 determines 306 that reduced size images 212 are not satisfactory for the outputting operation, the imaging device 202 may use 310 the full size images 210 instead of the reduced size images 212 for performing the outputting operation.

Figure 4:
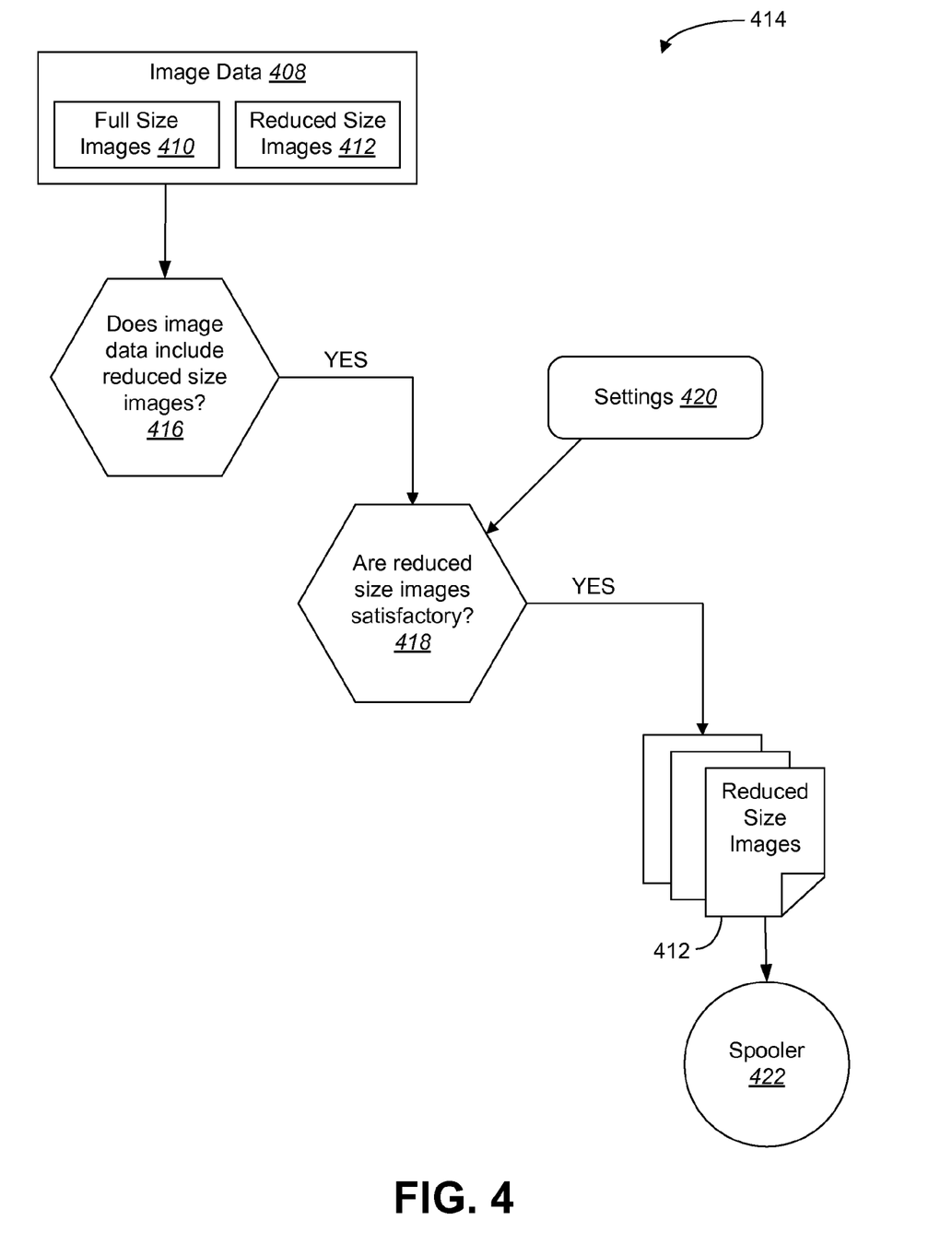
FIG. 4 is a functional block diagram illustrating some aspects of the operation of a host computer system in accordance with an embodiment.

FIG. 4 is a functional block diagram illustrating some aspects of the operation of a host computer system 414 in accordance with an embodiment. The context of FIG. 4 is that an outputting operation to be performed on an imaging device 102 has been initiated. As indicated above, some examples of outputting operations that may be performed by an imaging device 102 include printing, scanning, copying, filing, faxing, format conversion, digital media duplication, publishing to the World Wide Web, etc.

In response to the outputting operation being initiated, the host computer system 414 may create an imaging job to be sent to the imaging device 102. The imaging job may include image data 408 that is to processed as part of the desired outputting operation. The imaging job may also include one or more settings 420 that indicate how certain aspects of the desired outputting operation are carried out.

As part of creating the imaging job, the host computer system 414 may determine 416 whether the image data 408 that is to be processed as part of the imaging job includes reduced size images 412 in addition to full size images 410. As indicated above, the reduced size images 412 may be reduced size (e.g., lower resolution) versions of the full size images 410. For example, the reduced size images 412 may be thumbnail images corresponding to the full size images 410.

The host computer system 414 may also determine 418 whether reduced size images 412 are satisfactory for the desired outputting operation. The host computer system 414 may make this determination by examining one or more settings 420 associated with the imaging job. For example, the host computer system 414 may determine that reduced size images 412 are satisfactory for the outputting operation if the outputting operation comprises N-up printing, and N exceeds a threshold value. As another example, the host computer system 414 may determine that reduced size images 412 are satisfactory for the outputting operation if a draft output setting is associated with the imaging job. As another example, the host computer system 414 may determine that reduced size images 412 are satisfactory for the outputting operation if the image data 408 will be used for document indicia (e.g., if the image data 408 will be used as a watermark).

FIG. 4 shows the host computer system 414 determining 416 whether the image data 408 includes reduced size images 412 before determining 418 whether reduced size images 412 are satisfactory for the outputting operation. Alternatively, the host computer system 414 may determine 418 whether reduced size images 412 are satisfactory for the outputting operation before determining whether the image data 408 includes reduced size images 412. Alternatively still, these determinations 416, 418 may be made in parallel.

If the host computer system 414 determines 416 that the image data 408 includes reduced size images 412, and if the host computer system 414 also determines 418 that the reduced size images 412 are satisfactory for the desired outputting operation, the host computer system 414 may despool the reduced size images 412 to the imaging device 102 without despooling the full size images 410 to the imaging device 102. In other words, the host computer system 414 may filter out the full size images 410 from the image data 408 so that only the reduced size images 412 are despooled to the imaging device 102. A spooler 422 is shown in FIG. 4. The spooler 422 may implement the functionality of despooling the reduced size images 412 to the imaging device 102.

Filtering the full size images 410 out of the image data 408 may cause file offsets within the image data 408 to change. To compensate for this, the host computer system 414 may send the reduced size images 412 through a restreaming process that reorders the reduced size images 412 into streaming order. This may be done before the reduced size images 412 are despooled to the imaging device 102. Once the reduced size images 412 have been reordered in this manner, the reduced size images 412 may then be despooled to the imaging device 102. The settings 420 associated with the imaging job may also be despooled to the imaging device 102. The imaging device 102 may then process the imaging job, using the reduced size images 412, in accordance with the settings 420.

Figure 5:
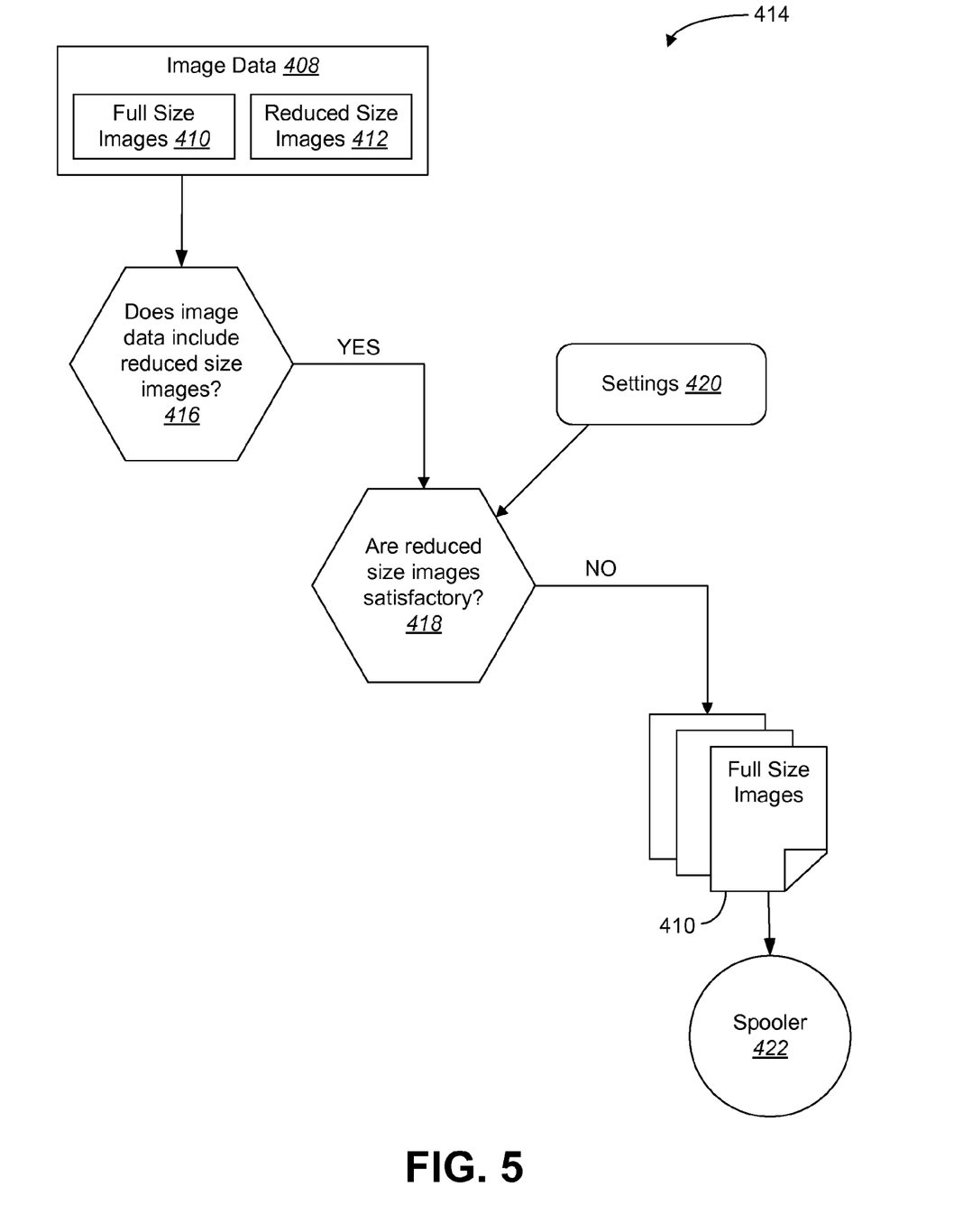
FIG. 5 is a functional block diagram illustrating some additional aspects of the operation of the host computer system of FIG. 4 in accordance with an embodiment.

FIG. 5 is a functional block diagram illustrating some additional aspects of the operation of the host computer system 414 of FIG. 4 in accordance with an embodiment. The context of FIG. 5 is similar to that of FIG. 4, namely that an outputting operation to be performed on an imaging device 102 has been initiated, and in response the host computer system 414 creates an imaging job to be sent to the imaging device 102. As part of creating the imaging job, the host computer system 414 may determine 416 whether the image data 408 that is to be processed as part of the imaging job includes reduced size images 412 in addition to full size images 410. In addition, the host computer system 414 may determine 418 whether reduced size images 412 are satisfactory for the desired outputting operation. The host computer system 414 may make this determination 418 by examining one or more settings 420 associated with the imaging job.

If the host computer system 414 determines 418 that the reduced size images 412 are not satisfactory for the desired outputting operation, the host computer system 414 may despool the full size images 410 to the imaging device 102 without despooling the reduced size images 412 to the imaging device 102. In other words, the host computer system 414 may filter out the reduced size images 412 from the image data 408 so that only the full size images 410 are despooled to the imaging device 102. The spooler 422 that is shown in FIG. 5 may implement the functionality of despooling the full size images 410 to the imaging device 102.

Filtering the reduced size images 412 out of the image data 408 may cause file offsets within the image data 408 to change. To compensate for this, the host computer system 414 may send the full size images 410 through a restreaming process that reorders the full size images 410 into streaming order. This may be done before the full size images 410 are despooled to the imaging device 102. Once the full size images 410 have been reordered in this manner, the full size images 410 may then be despooled to the imaging device 102. The settings 420 associated with the imaging job may also be despooled to the imaging device 102. The imaging device 102 may then process the imaging job, using the full size images 410, in accordance with the settings 420.

Figure 6:
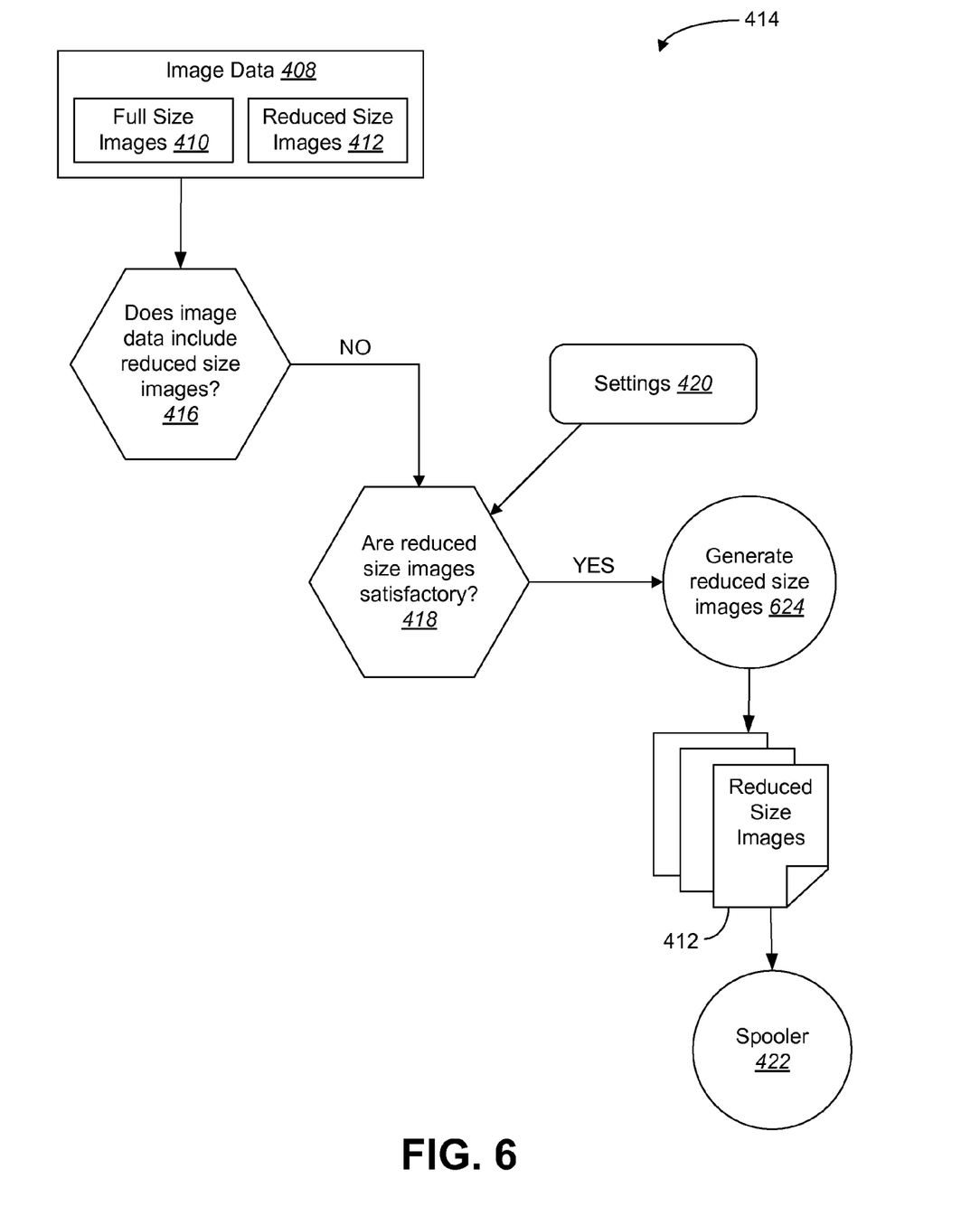
FIG. 6 is a functional block diagram illustrating some additional aspects of the operation of the host computer system of FIGS. 4 and 5 in accordance with an embodiment.

FIG. 6 is a functional block diagram illustrating some additional aspects of the operation of the host computer system 414 of FIGS. 4 and 5 in accordance with an embodiment. The context of FIG. 6 is similar to that of FIGS. 4 and 5, namely that an outputting operation to be performed on an imaging device 102 has been initiated, and in response the host computer system 414 creates an imaging job to be sent to the imaging device 102. As part of creating the imaging job, the host computer system 414 may determine 416 whether the image data 408 that is to be processed as part of the imaging job includes reduced size images 412 in addition to full size images 410. In addition, the host computer system 414 may determine 418 whether reduced size images 412 are satisfactory for the desired outputting operation. The host computer system 414 may make this determination 418 by examining one or more settings 420 associated with the imaging job.

The host computer system 414 may determine 418 that reduced size images 412 are satisfactory for the desired outputting operation. However, the host computer system 414 may also determine 416 that the image data 408 does not include any reduced size images 412. In this situation, the host computer system 414 may generate 624 the reduced size images 412 from the full size images 410. If multiple reduced size images 412 are generated, the reduced size images 412 may be concatenated into a single image file. The host computer system 414 may then despool the reduced size images 412 to the imaging device 102 without despooling the full size images 410 to the imaging device 102. The settings 420 associated with the imaging job may also be despooled to the imaging device 102. The imaging device 102 may then process the imaging job, using the reduced size images 412, in accordance with the settings 420.

Figure 7:
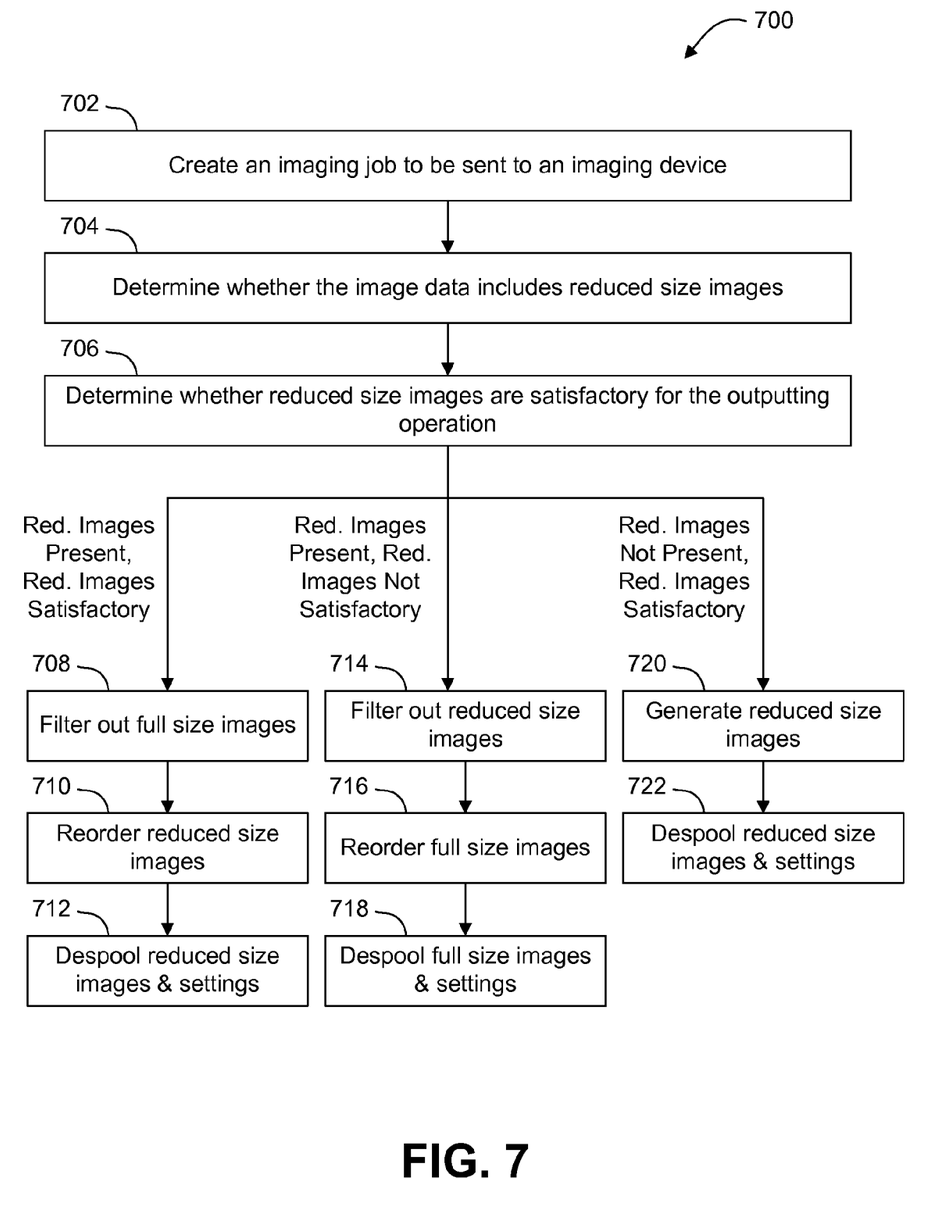
FIG. 7 is a flow diagram illustrating a method that may be implemented by a host computer system in accordance with an embodiment.

FIG. 7 is a flow diagram illustrating a method 700 that may be implemented by a host computer system 414 in accordance with an embodiment. In accordance with the depicted method 700, the host computer system 414 may create 702 an imaging job to be sent to an imaging device 102. The imaging job may include image data 408 that is to be processed as part of a desired outputting operation.

As part of creating the imaging job, the host computer system 414 may determine 704 whether the image data 408 that is to be processed as part of the imaging job includes reduced size images 412 in addition to full size images 410. The host computer system 414 may also determine 706 whether reduced size images 412 are satisfactory for the desired outputting operation. As indicated above, the host computer system 414 may make this determination 706 by examining one or more settings 420 associated with the imaging job.

FIG. 7 shows the host computer system 414 determining 704 whether the image data 408 includes reduced size images 412 before determining 706 whether reduced size images 412 are satisfactory for the outputting operation. Alternatively, the host computer system 414 may determine 706 whether reduced size images 412 are satisfactory for the outputting operation before determining 704 whether the image data 408 includes reduced size images 412. Alternatively still, these determinations 704, 706 may be made in parallel.

If the host computer system 414 determines 704 that the image data 408 includes reduced size images 412, and if the host computer system 414 determines 706 that the reduced size images 412 are satisfactory for the desired outputting operation, the host computer system 414 may filter 708 out the full size images 410 from the image data 408. Because filtering 708 the full size images 410 out of the image data 408 may cause file offsets within the image data 408 to change, the reduced size images 412 may be sent through a restreaming process that reorders 710 the reduced size images 412 into streaming order. Once the reduced size images 412 have been reordered 710 in this manner, the reduced size images 412 may then be despooled 712 to the imaging device 102, without the full size images 410. The settings 420 associated with the imaging job may also be despooled 712 to the imaging device 102. The imaging device 102 may then process the imaging job, using the reduced size images 412, in accordance with the settings 420.

If the host computer system 414 determines 704 that the image data 408 includes reduced size images 412, but the host computer system 414 determines 706 that reduced size images 412 are not satisfactory for the desired outputting operation, the host computer system 414 may filter 714 out the reduced size images 412 from the image data 408. Because filtering 714 the reduced size images 412 out of the image data 408 may cause file offsets within the image data 408 to change, the full size images 410 may be sent through a restreaming process that reorders 716 the full size images 410 into streaming order. Once the full size images 410 have been reordered 716 in this manner, the full size images 410 may then be despooled 718 to the imaging device 102, without the reduced size images 412. The settings 420 associated with the imaging job may also be despooled 718 to the imaging device 102. The imaging device 102 may then process the imaging job, using the full size images 410, in accordance with the settings 420.

If the host computer system 414 determines 704 that the image data 408 does not include reduced size images 412, but the host computer system 414 also determines 706 that reduced size images 412 are satisfactory for the desired outputting operation, the host computer system 414 may generate 720 the reduced size images 412 from the full size images 410. If multiple reduced size images 412 are generated, the reduced size images 412 may be concatenated into a single image file. The host computer system 414 may then despool 722 the reduced size images 412 to the imaging device 102 without despooling the full size images 410 to the imaging device 102. The settings 420 associated with the imaging job may also be despooled 722 to the imaging device 102. The imaging device 102 may then process the imaging job, using the reduced size images 412, in accordance with the settings 420.

Figure 8:
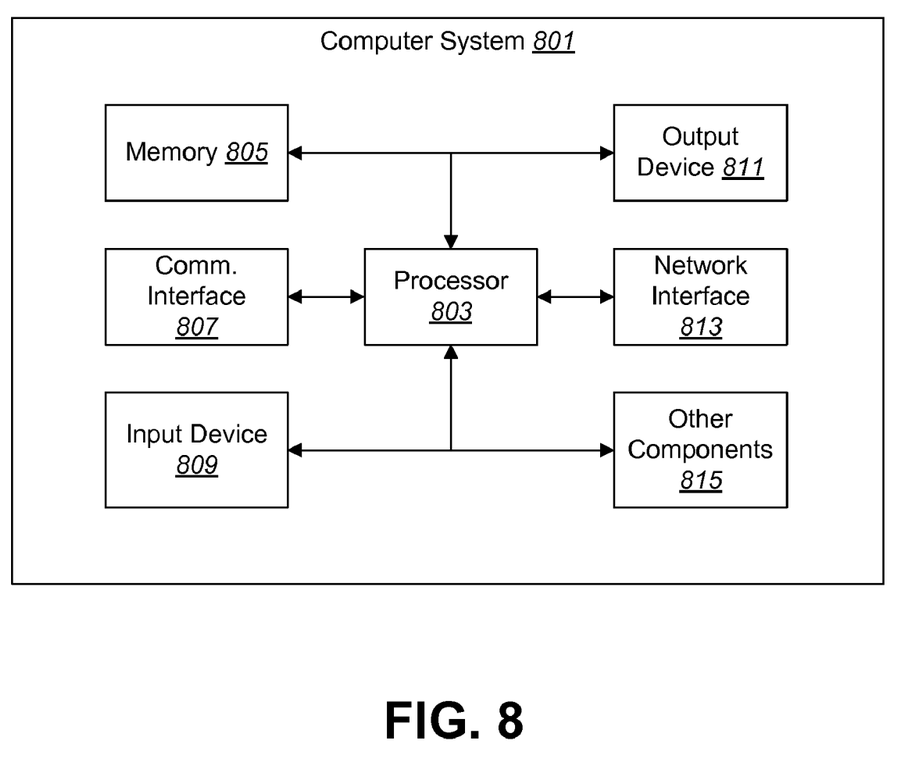
FIG. 8 illustrates various components that may be utilized in a computer system.

FIG. 8 illustrates various components that may be utilized in a computer system 801. Some or all of the components shown in the computer system 801 of FIG. 8 may be provided in the imaging devices 102, 202 and the host computer system 414 described above. The illustrated components may be located within the same physical structure or in separate housings or structures.

The computer system 801 is shown with a processor 803 and memory 805. The processor 803 may control the operation of the computer system 801 and may be embodied as a microprocessor, a microcontroller, a digital signal processor (DSP) or other device known in the art. The processor 803 typically performs logical and arithmetic operations based on program instructions stored within the memory 805. The instructions in the memory 805 may be executable to implement the methods described herein.

The computer system 801 may also include one or more communication interfaces 807 and/or network interfaces 813 for communicating with other electronic devices. The communication interface(s) 807 and the network interface(s) 813 may be based on wired communication technology, wireless communication technology, or both.

The computer system 801 may also include one or more input devices 809 and one or more output devices 811. The input devices 809 and output devices 811 may facilitate user input. Other components 815 may also be provided as part of the computer system 801.

FIG. 8 illustrates only one possible configuration of a computer system 801. Various other architectures and components may be utilized.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as limiting the scope of the claims.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM, USB thumb drive, and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

While specific embodiments have been illustrated and described, it is to be understood that the claims are not limited to the precise configuration and components illustrated above. Various modifications, changes and variations may be made in the arrangement, operation and details of the embodiments described above without departing from the scope of the claims.

What is claimed is:

1. An apparatus that is configured to efficiently handle image data, the apparatus comprising:
   a processor;
   memory in electronic communication with the processor;
   instructions stored in the memory, the instructions being executable to:
   create an imaging job that comprises image data corresponding to an outputting operation that is to be performed by an imaging device;
   determine whether the image data comprises one or more reduced size images in addition to one or more full size images, wherein the one or more reduced size images are reduced size versions of the one or more full size images;
   determine whether the one or more reduced size images are satisfactory for the outputting operation, wherein the imaging device determines that the one or more reduced size images are satisfactory for the outputting operation if the outputting operation comprises N-up printing, and N exceeds a threshold value;
   if the image data comprises the one or more reduced size images, and if the one or more reduced size images are satisfactory for the outputting operation, despool the one or more reduced size images to the imaging device, wherein despooling the one or more reduced size images to the imaging device comprises filtering out the one or more full size images; and
   if the image data comprises the one or more reduced size images, and if the one or more reduced size images are not satisfactory for the outputting operation, despool the one or more full size images without despooling the one or more reduced size images to the imaging device.

2. The imaging device of claim 1, wherein determining whether the one or more reduced size images are satisfactory for the outputting operation comprises examining one or more settings associated with the imaging job.

3. The imaging device of claim 1, wherein the imaging device determines that the one or more reduced size images are satisfactory for the outputting operation if a draft output setting is associated with the imaging job.

4. The imaging device of claim 1, wherein the imaging device determines that the one or more reduced size images are satisfactory for the outputting operation if the image data will be used for document indicia.

5. The imaging device of claim 1, wherein the imaging device is a multi-function peripheral device.

6. The imaging device of claim 1, wherein the outputting operation is selected from the group consisting of printing, scanning, copying, filing, faxing, format conversion, digital media duplication, and publishing to the World Wide Web.

7. A non-transitory computer-readable medium comprising instructions that are executable by a host computer system to:
   create an imaging job that comprises image data corresponding to an outputting operation that is to be performed by an imaging device;
   determine whether the image data comprises one or more reduced size images in addition to one or more full size images, wherein the one or more reduced size images are reduced size versions of the one or more full size images;
   determine whether the one or more reduced size images are satisfactory for the outputting operation, wherein the host computer system determines that the one or more reduced size images are satisfactory for the outputting operation if the outputting operation comprises N-up printing, and N exceeds a threshold value;
   if the image data comprises the one or more reduced size images in addition to the one or more full size images, and if the one or more reduced size images are satisfactory for the outputting operation, despool the one or more reduced size images to the imaging device wherein despooling the one or more reduced size images to the imaging device comprises filtering out the one or more full size images; and
   if the image data comprises the one or more reduced size images in addition to the one or more full size images, and if the one or more reduced size images are not satisfactory for the outputting operation, the instructions are executable to despool the one or more full size images to the imaging device without despooling the one or more reduced size images to the imaging device.

8. The non-transitory computer-readable medium of claim 7, wherein if the image data comprises the one or more reduced size images in addition to the one or more full size images, and if the one or more reduced size images are satisfactory for the outputting operation, the instructions are also executable to send the one or more reduced size images through a restreaming process that reorders the one or more reduced size images into streaming order.

9. The non-transitory computer-readable medium of claim 7, wherein if the image data comprises the one or more reduced size images in addition to the one or more full size images, and if the one or more reduced size images are not satisfactory for the outputting operation, the instructions are also executable to send the one or more full size images through a restreaming process that reorders the one or more full size images into streaming order.

10. The non-transitory computer-readable medium of claim 7, wherein if the image data does not comprise the one or more reduced size images in addition to the one or more full size images, and if the one or more reduced size images are satisfactory for the outputting operation, the instructions are executable to:
  generate the one or more reduced size images from the one or more full size images; and
  despool the one or more reduced size images to the imaging device without despooling the one or more full size images to the imaging device.

11. The non-transitory computer-readable medium of claim 7, wherein determining whether the one or more reduced size images are satisfactory for the outputting operation comprises examining one or more settings associated with the imaging job.

12. The non-transitory computer-readable medium of claim 7, wherein the host computer system determines that the one or more reduced size images are satisfactory for the outputting operation if a draft output setting is associated with the imaging job.

13. The non-transitory computer-readable medium of claim 7, wherein the host computer system determines that the one or more reduced size images are satisfactory for the outputting operation if the image data will be used for document indicia.

14. The non-transitory computer-readable medium of claim 7, wherein the outputting operation is selected from the group consisting of printing, scanning, copying, filing, faxing, format conversion, digital media duplication, and publishing to the World Wide Web.

15. A method for efficiently handling image data, the method being implemented by a host computer system, the method comprising:
  creating an imaging job that comprises image data corresponding to an outputting operation that is to be performed by an imaging device;
  determining whether the image data comprises one or more reduced size images in addition to one or more full size images, wherein the one or more reduced size images are reduced size versions of the one or more full size images;
  determining whether the one or more reduced size images are satisfactory for the outputting operation, wherein the imaging device determines that the one or more reduced size images are satisfactory for the outputting operation if the outputting operation comprises N-up printing, and N exceeds a threshold value;
  if the image data comprises the one or more reduced size images in addition to the one or more full size images, and if the one or more reduced size images are satisfactory for the outputting operation, despooling the one or more reduced size images to the imaging device, wherein despooling the one or more reduced size images to the imaging device comprises filtering out the one or more full size images; and
  if the image data comprises the one or more reduced size images in addition to the one or more full size images, and if the one or more reduced size images are not satisfactory for the outputting operation, further comprising despooling the one or more full size images to the imaging device without despooling the one or more reduced size images to the imaging device.

* * * * *